United States Patent
Kosvintsev (10) Patent No.: US 10,526,710 B2
(45) Date of Patent: Jan. 7, 2020

(54) METHOD OF PRODUCING UNIFORM POLYMER BEADS BY VIBRATION JETTING WITH SUPERHYDROPHOBIC MEMBRANE

(71) Applicant: Purolite (China) Co., Ltd., Zhejiang Province (CN)

(72) Inventor: Serguei Rudolfovich Kosvintsev, Porth (GB)

(73) Assignee: Purolite (China) Co., Ltd., Deqing County, Zhejiang Province (CN)

( * ) Notice: Subject to any disclaimer, the term of this patent is extended or adjusted under 35 U.S.C. 154(b) by 107 days.

(21) Appl. No.: 15/833,584

(22) Filed: Dec. 6, 2017

(65) Prior Publication Data

US 2018/0171484 A1    Jun. 21, 2018

Related U.S. Application Data

(60) Provisional application No. 62/435,499, filed on Dec. 16, 2016.

(30) Foreign Application Priority Data

Feb. 22, 2017   (CN) .......................... 2017 1 0096177

(51) Int. Cl.
 *B01J 2/18* (2006.01)
 *B01J 2/06* (2006.01)
 (Continued)

(52) U.S. Cl.
 CPC ................ *C23C 18/32* (2013.01); *B01J 2/06* (2013.01); *B01J 2/12* (2013.01); *B01J 2/18* (2013.01); *C08B 37/0039* (2013.01); *C08F 2/00* (2013.01); *C08F 2/18* (2013.01); *C08L 5/12* (2013.01); *C23C 18/1662* (2013.01); *C25D 1/08* (2013.01); *C23C 18/1651* (2013.01)

(58) Field of Classification Search
 None
 See application file for complete search history.

(56) References Cited

U.S. PATENT DOCUMENTS 4,444,961 A * 4/1984 Timm ..................... B01J 14/00
                                                          521/38
4,623,706 A   11/1986 Timm et al.
(Continued)

FOREIGN PATENT DOCUMENTS

EP    0 051 210    5/1982

OTHER PUBLICATIONS

International Search Report and Written Opinion for International Application No. PCT/EP2017/082976 dated Mar. 5, 2018.

*Primary Examiner* — Mary Lynn F Theisen
(74) *Attorney, Agent, or Firm* — Fish & Richardson P.C.

(57) ABSTRACT

Spheroidal polymer beads having a uniform size are prepared by polymerizing uniformly sized monomer droplets formed by dispersing a polymerizable monomer phase over double-walled cylindrical cross-flow membrane into an suspension phase. A shear force is provided at a point of egression of the polymerizable monomer phase into the suspension phase, the direction of shear substantially perpendicular to the direction of egression of the monomer phase. The membrane is metallic and includes a superhydrophobic coating.

32 Claims, 5 Drawing Sheets

(51) Int. Cl.

| | |
|---|---|
| *B01J 2/12* | (2006.01) |
| *C23C 18/32* | (2006.01) |
| *C08F 2/00* | (2006.01) |
| *C08F 2/18* | (2006.01) |
| *C08L 5/12* | (2006.01) |
| *C25D 1/08* | (2006.01) |
| *C23C 18/16* | (2006.01) |
| *C08B 37/00* | (2006.01) |

(56) References Cited

U.S. PATENT DOCUMENTS

| | | | | |
|---|---|---|---|---|
| 4,666,673 | A * | 5/1987 | Timm | B29B 9/10 422/134 |
| 2008/0286556 | A1* | 11/2008 | D'urso | B01D 61/12 428/315.5 |
| 2010/0103769 | A1* | 4/2010 | Bachman | B01F 3/0446 366/340 |
| 2011/0033663 | A1* | 2/2011 | Svec | C08F 220/18 428/141 |
| 2012/0044299 | A1* | 2/2012 | Winger | B41J 2/1606 347/54 |
| 2012/0175798 | A1 | 7/2012 | Fukuda et al. | |
| 2014/0131263 | A1* | 5/2014 | Bachand | B01D 53/228 210/188 |
| 2014/0264984 | A1 | 9/2014 | Kosvintsev | |
| 2015/0328608 | A1* | 11/2015 | Liu | B01J 2/06 526/273 |

* cited by examiner

Volume Statistics (Arithmetic)   AC Int 1 Jetted SK 5-69...12 Aug 2016...

Calculations from 20.00 μm to 200.0 μm
Volume:  $5,175*10^5$ μm³
Mean:    70.41 μm        S.D.:   11.51 μm
Median:  69.69 μm        C.V.:   16.3%
Mode:    67.51 μm $d_{10}$: 57.23 μm     $d_{50}$: 69.69 μm     $d_{90}$: 84.87 μm >10%       >25%       >50%       >75%       >90%
84.67 μm   77.66 μm   69.69 μm   62.61 μm   57.23 μm

METHOD OF PRODUCING UNIFORM POLYMER BEADS BY VIBRATION JETTING WITH SUPERHYDROPHOBIC MEMBRANE

FIELD OF THE INVENTION

The present invention relates generally to the preparation of spheroidal polymer beads, and more particularly, to the preparation of spheroidal polymer beads having a substantially uniform particle size by vibration jetting with a superhydrophobic membrane.

BACKGROUND OF THE INVENTION

Spheroidal polymer beads in the size range from about 1 to 300 µm in diameter are useful for a variety of applications. For example, such polymer beads have been employed for various chromatographic applications, as substrates for ion exchange resins, seeds for the preparation of larger sized polymer particles, calibration standards for blood cell counters, aerosol instruments, in pollution control equipment, and as spacers for photographic emulsions, among other uses.

Unfortunately, however, the preparation of uniformly sized polymer beads using known methods is often not suitable for large-scale production. Typically, polymer beads can be prepared by suspension polymerization by dispersing an organic monomer phase as droplets in a vessel equipped with an agitator and an aqueous phase in which the monomer and resulting polymer are essentially insoluble. The dispersed monomer droplets are subsequently polymerized under continuous agitation (see, for example, U.S. Pat. Nos. 3,728,318; 2,694,700; and 3,862,924). Polymer beads are also manufactured by "jetting" liquid organic monomer mixtures through capillary openings into an aqueous phase or gaseous phase. The monomer droplets are then transported to a reactor where polymerization occurs, as described, for example, in U.S. Pat. Nos. 4,444,961; 4,666,673; 4,623,706; and 8,033,412. However, these conventional methods, such as stirred batch polymerization, often produce bead products exhibiting large particle size distributions, primarily due to problems of non-controllable coalescence and/or breakage of the suspended monomer droplets. Existing jetting methods also suffer from high cost and low output for particle size products of less than 300 µm. For example, plate jetting methods have low overall productivity and are limited by large energy losses during the vibration generation step. Moreover, methods which require jetting into a gaseous media demand very sophisticated equipment and complex methods for polymer formation. The use of cross-flow membranes for the generation of fine droplets using a metal or glass sintered or electro-formed membrane is appropriate for small scale applications but is unfeasible for commercial operation. Further, the low productivity per unit area of the cross flow membrane requires complex and bulky equipment which is unreliable and demands high capital and operating costs. Metallic plate or can-shaped membranes, preferably of nickel or nickel-plated are desirable for use in vibration jetting. However, while such plates are relatively long-lived, over time they are known to experience wear during use. Such wear alters the configuration and geometry of the membrane pores (or "through holes"; as used herein the terms pores and through holes are interchangeable), and increases non-uniform drag on the monomer, resulting in inconsistent, non-uniform bead production and increased energy costs. Therefore, an object of the present invention is to provide a metallic membrane with a durable surface, providing a long service life without deterioration. Other jetting method for producing polymer beads are described in U.S. Pat. Nos. 9,028,730 and 9,415,530.

SUMMARY OF THE INVENTION

An object of the invention is to provide a method for preparing uniform sized spheroidal polymer beads having a uniform particle size and narrow particle size distribution, using vibration jetting with a superhydrophobic membrane. In particular, the polymer beads are made from water soluble (hydrophilic) substances such as agarose and other gelating natural hydrocolloids such as chitin, pectin, gelatin, gellan, cellulose, alginate, carrageenan, starch, xanthan gum, among others. In addition, gelating synthetic polymers such as PVA, (polyvinyl acetate), PVP (polyvinyl pyrrolidone) and PEG (polyethylene glycol) may be employed. Further, polymerizable water soluble monomers such as acrylic among others may be used. As used herein, each of these starting materials are referred to interchangeably as forming "polymers" or "hydrocolloids". Of these starting materials, agarose is preferred. Agarose beads are useful as providing a base for example in chromatography media. Agarose is resistant to acid, base and solvents, is hydrophilic, has high porosity and a large number of hydroxyl groups for functionalization. See U.S. Pat. No. 7,678,302.

Accordingly, one embodiment of the invention is directed to a method for preparing uniform spheroidal polymer beads having a volume mean particle diameter ($D_{50}$) of about 15 to about 200 µm. The method includes providing a double-walled cylindrically shaped apparatus having a metallic membrane containing a plurality of pores. A first volume enters the annulus between two membrane walls, a second volume is in contact with two outer walls of the membrane enclosing the annulus. The first volume includes a dispersed phase, for example a polymerizable monomer phase or hydrocolloid solution. The second volume includes a suspension phase immiscible with the dispersed phase. The first volume is dispersed through the pores into the second volume under conditions sufficient to form droplets of the dispersed phase. A shear force is provided at a point of egression of the first volume into the second volume. The direction of shear is substantially perpendicular to the direction of egression of the first volume. The dispersed phase droplets dispersed in the second volume are then polymerized (or cross-linked or gelate), forming the desired polymer beads.

In another embodiment, the invention provides a polymerization product in the form of polymer beads having a particle size of about 10 to about 300 µm wherein at least about 70 percent of the beads possess a particle size from about 0.9 to about 1.1 times the average particle size of the beads.

In another embodiment, the invention provides a membrane for use in producing uniform polymer beads by vibration jetting, the membrane including a metallic plate with a plurality of pores and coated with a superhydrophobic coating providing a durable wear surface for longer service life and also providing more uniform polymer bead characteristics.

Additional advantages, objects, and features of the invention are set forth in part in the description which follows and will become apparent to those having ordinary skill in the art.

BRIEF DESCRIPTION OF THE DRAWINGS

Non-limiting and non-exhaustive embodiments of the present invention are described with reference to the following drawings. For a better understanding of the present invention, reference will be made to the following Detailed Description, which is to be read in association with the accompanying drawings, wherein.

DETAILED DESCRIPTION OF THE INVENTION

It is understood that the invention(s) described herein is (are) not limited to the particular methodologies, protocols, and reagents described, as these may vary. It is also to be understood that the terminology used herein is for the purpose of describing particular embodiments only, and is not intended to limit the scope of the present invention. Unless defined otherwise, all technical and scientific terms used herein have the same meanings as commonly understood by one of ordinary skill in the art to which this invention belongs. Any methods and materials similar or equivalent to those described herein can be used in the practice or testing of the present invention.

All publications, including all patents, patent applications and other patent and non-patent publications cited or mentioned herein are incorporated herein by reference for at least the purposes that they are cited; including for example, for the disclosure or descriptions of methods of materials which may be used in the invention. Nothing herein is to be construed as an admission that a publication or other reference (including any reference cited in the "Background of the Invention" section alone) is prior art to the invention or that the invention is not entitled to antedate such disclosure, for example, by virtue of prior invention.

The skilled artisan will appreciate that the numerical values presented herein are approximate values. Generally, unless otherwise indicated, terms such as "about" and "approximately" include within 20% of the values indicated, more preferably within 10% and even more preferably within 5%.

Figure 1:
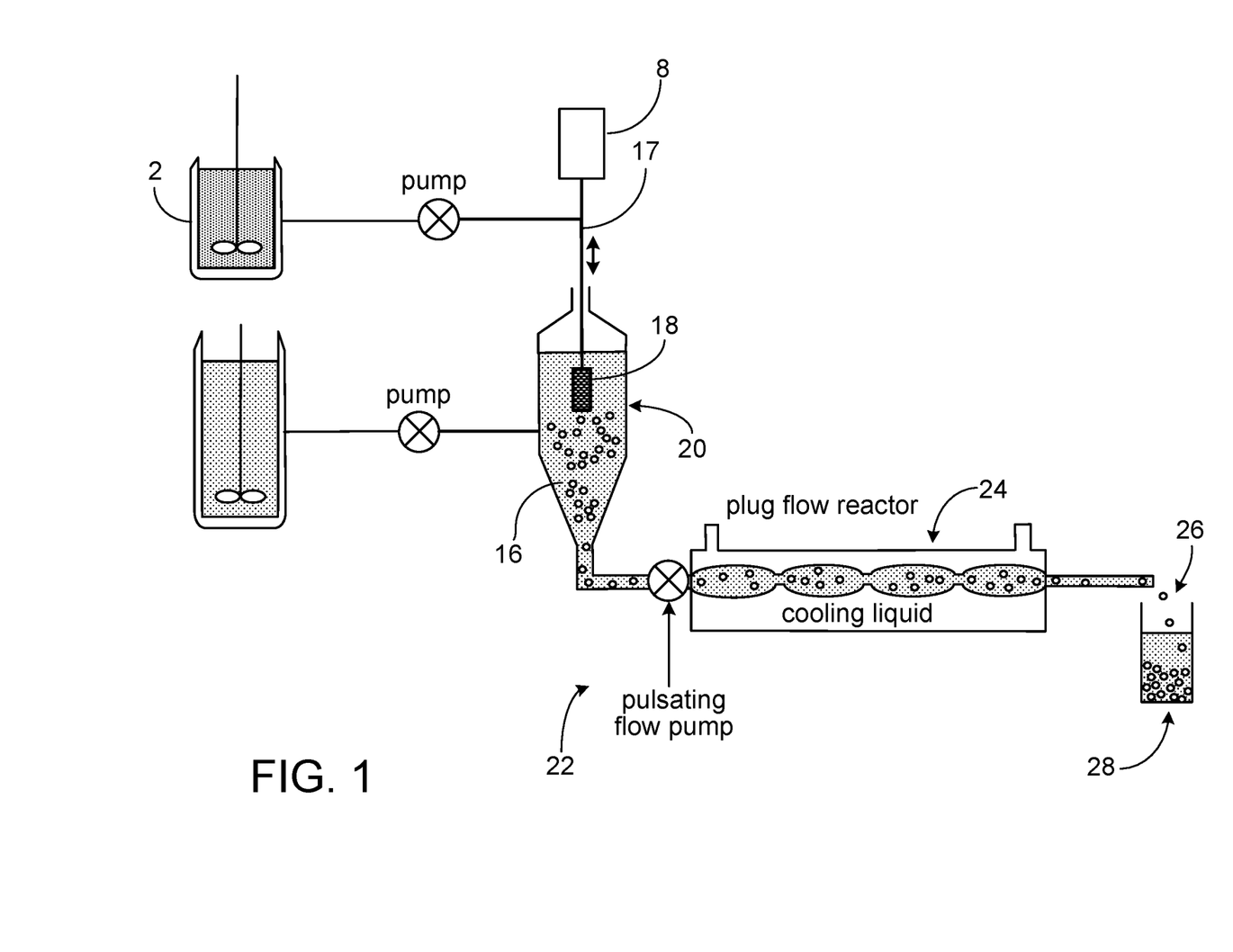
FIG. 1 is a schematic representation illustrating a reactor unit of the invention.
Figure 2:
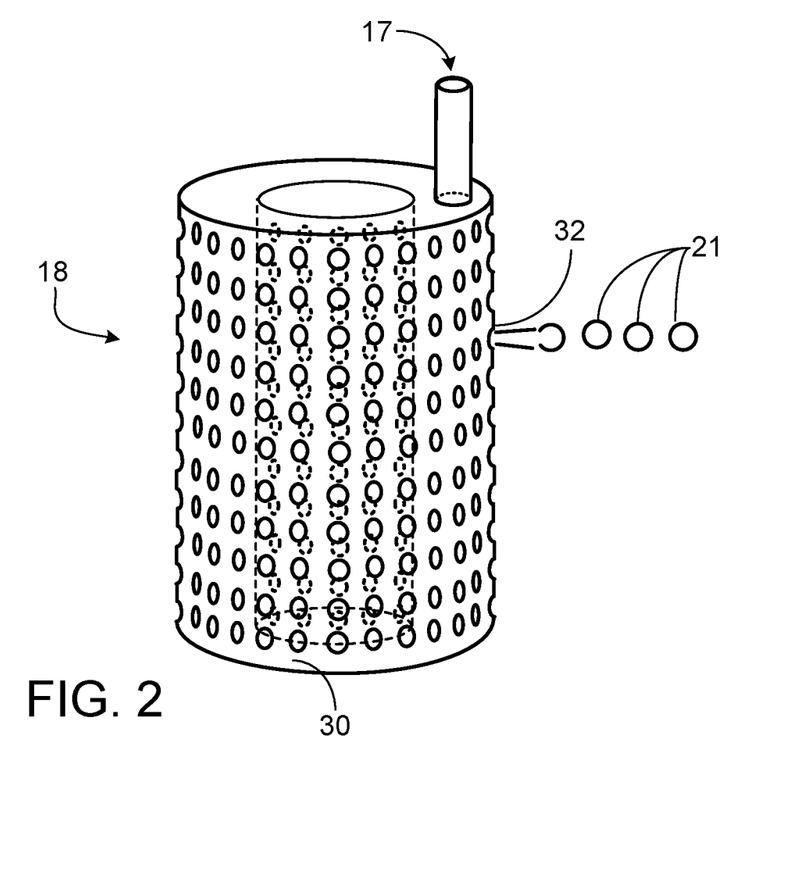
FIG. 2 is a schematic representation illustrating a can-shaped membrane of the invention.

Referring now more particularly to the drawings, FIG. 1 depicts reactor unit 20 having a jet-forming membrane 18 which connects with a feed tube 17 attached to a reservoir 2. A shaker for vibrating the membrane 18 includes a vibrator 8 which incorporates the feed tube 17. The vibrator is connected by electrical contact to a variable frequency (oscillating) electrical signal generator (not shown) in a manner so that the vibrator 8 vibrates at the frequency generated by the oscillating signal generator. In FIG. 2, membrane 18 includes an annulus 30 containing a dispersed phase (polymerizable monomer or hydrocolloid). Membrane 18 is supplied with the dispersed phase via feeding tube 17. Membrane 18 is also suspended in a liquid phase 16 of a suspension medium containing a liquid immiscible with the dispersed phase. The membrane 18 is configured in the shape of a double-walled can or cylinder comprising an outer cylindrical component with a continuous side wall, and an inner cylindrical component with a continuous side wall enclosing the annulus. As shown in FIG. 2, the side wall of the inner component is spaced inwardly from the side wall of the outer component and includes a constant diameter throughout the height of the outer wall. The side wall of the inner component and the side wall of the outer component include continuous upper and bottom rims and the rims are joined to form an air tight compartment between the inner and outer components. The inside and outside wall of membrane 18 includes through-holes (or pores) 32. The cylindrical double-walled shape of membrane 18 ensures that equal force/acceleration is obtained in every pore 32 on the membrane 18. This is necessary to ensure uniform bead generation.

In operation, the dispersed phase includes a phase containing mixtures of one or more co-polymerizable monomers, or mixtures of one or more copolymerizable monomers or a hydrocolloid (such as dextrose and agarose, (polysaccharides)) or other gel forming compound (such as PEG, PVA) with a non-polymerizable material (e.g., an inert porogenic or pore-forming material, pre-polymer, or the like) is introduced to the feed tube 17 via the reservoir 2 and is deposited in (or fills) the annulus 30 in the membrane 18. The dispersed phase is fed into the feed tube 17 at a rate such that the dispersed phase is forced through pores 32 of membrane 18 into liquid phase 16 at a rate sufficient to form jets having flow characteristics to form a plurality of dispersed phase droplets 21. The dispersed phase droplets are generated directly into a reactor unit 20.

As the dispersed phase jet flows into liquid phase 16, the jet is excited at a frequency which breaks the jet into droplets. In general, membrane 18 is excited using suitable conditions so that substantially uniform sized droplets are prepared. By the term "substantially uniform" is meant that droplets exhibit a particle size distribution having a coefficient of variance (i.e., the standard deviation of the population divided by the population mean) of less than about 30% or about 10, 15, 20, 25, or about 29%. A coefficient of variation of less than about 15% is preferred. In another embodiment of the invention, about 70 percent, or about 90 percent, of the beads possess a volume particle diameter from about 0.90 and about 1.1 times the average volume particle diameter of the beads.

The particular conditions at which the droplets are formed depend on a variety of factors, particularly the desired size and uniformity of the resulting droplets and the resulting spheroidal polymer beads. In general, the dispersed bead droplets are preferably prepared to have a coefficient of variance of particle size distribution of less than about 20%, more preferably less than about 15%. Most preferably, the coefficient of variance of the particle size of the monomer droplets is less than about 10%. After forming the dispersed phase droplets, the subsequent polymerization or gel formation of the dispersed phase is performed using conditions which do not cause significant coalescence or additional dispersion and that will result in the formation of spheroidal polymer beads having a particle size such that at least about 50 volume percent have a particle diameter from about 0.9 to about 1.1 times the average particle diameter of the beads. Advantageously, at least about 60 volume percent, preferably 70 volume percent, more preferably at least about 75 volume percent of the beads exhibit such particle size. The invention also provides spheroidal polymer beads having a volume average particle diameter (i.e., the mean diameter based on the unit volume of the particle) between about 1 μm to about 300 μm. The average volume diameter of the polymer bead of the invention is preferably between about 1 μm and about 300 μm, more preferably between about 10 to about 180 µm, or about 35 to about 180 µm with additional preferred ranges of between about 40 µm to about 180 µm, about 100 to about 160 µm. The volume average particle diameter can be measured by any conventional method, for example, using optical imaging, laser diffraction or elecrozone sensing. Electrozone sensing involves the analysis of particle samples immersed in a conducting aqueous solution. Within the solution is an anode and a cathode formed in shape of an orifice. The particles are pumped through the orifice by pressure. Each particle displaces some amount of liquid as it passes through the orifice and causes a disruption in the electric field. The extent of the disruption corresponds to the size of the particle, and by measuring the number and size of the changes in impedance, it is possible to track particle distribution. The particle diameter may also be measured using optical microscopy or by employing other conventional techniques such as those described in U.S. Pat. No. 4,444,961.

Figure 3:
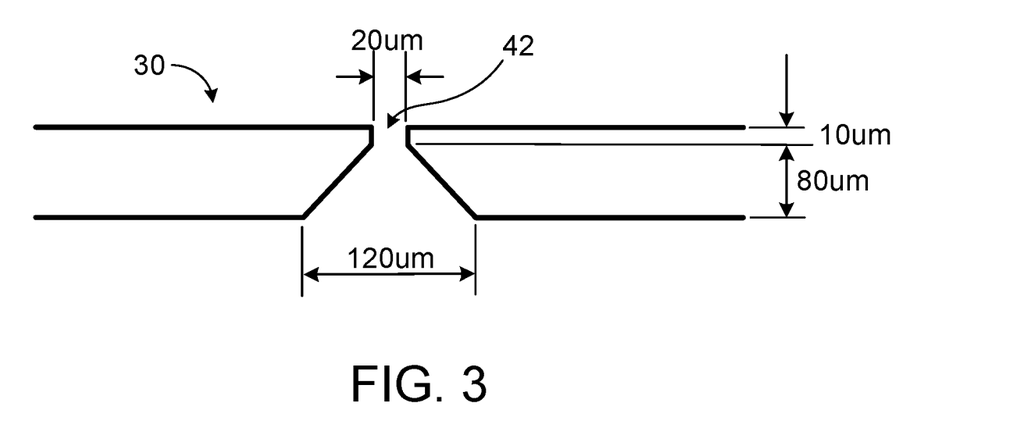
FIG. 3 is a schematic representation illustrating a membrane pore of the invention.

Regarding the various elements of the invention, jet-forming membrane 18 can include any means through which the dispersed phase can be passed under conditions such that a jet or plurality of jets of the dispersed phase is formed having laminar flow characteristics. Although membrane 18 can consist of a plate or similar device having a plurality of pores, it is preferred that membrane 18 includes a double walled can-shape enclosing an annulus as shown in FIG. 2. Using a can-shaped membrane allows a relatively small volume to be occupied in the reactor and also affords high productivity generation of uniform drops, ranging from 0.006 to 0.6 kg/hour per $cm^2$ of membrane. For example, for a can membrane of 6×16 cm, productivity can be from 3 kg/hr up to 300 kg/hour. Membrane 18 may also be in the form of a candle, spiral wound, or flat. The external walls enclosing the annulus of membrane 18 contains a plurality of through pores 32. For example, the membrane can include about 200 to about 40,000, preferably 1,500 to 4,000 pores per $cm^2$ throughout the surface of the membrane. The shape of the membrane pores may vary. For example, the shape of the pores can be cylindrical, or conical. FIG. 3 is a schematic illustrating conical-shaped membrane pore 42 of the invention. In another embodiment, the pores are in the shape of a slot. In this embodiment, the slot includes an aspect ratio of slot width to slot length of at least 1:2, preferably 1:3. The aspect ratio of slot width to slot length may be in the range of 1:2 to 1:100. The membrane pores may be fabricated by any conventional method. For example, the membrane pores may be fabricated by drilling or electro-forming. The membrane pores are preferably electro-formed by electroplating or electroless plating of nickel on a suitable mandrel. Use of electro-formed membranes enables a variety of pore sizes and shapes with virtually any pitch required. This gives the possibility of fine tuning drop sizes and achieving high production of polymer beads with well-defined particle size distributions. Electroforming as opposed to mechanical drilling allows for the production of round pores with a higher number of pores per unit area. In some embodiments of the invention, the membrane pores are perpendicular to the surface. In another embodiment, the membrane pores are positioned at an angle, preferably at an angle from 40 to 50 degrees. The diameter of pores 32 can range from less than about 1.0 µm to about 100 µm, preferably 10 µm to 50 µm, wherein diameter refers to the cross-section of the opening having the smallest diameter 42. The diameter of each opening is primarily determined by the desired size of the dispersed phase droplets. Typically, the desired droplet size will vary from about 5 to about 300 µm, more typically from about 25 to about 120 µm, most typically from about 40 to about 110 µm. While the pore diameter which will produce this size droplet is dependent on a variety of factors including the physical properties, e.g., viscosity, density and surface tension of the dispersed phase, and the conditions of the vibrational excitation, typically, pore diameters from about 1 to about 100 µm, more typically from about 10 to about 45 µm are employed.

The plurality of pores 32 in membrane 18 are spaced at a distance apart from each other so that the formation of the uniformly sized monomer droplets and the stability of the resulting droplets are not affected by the laminar jet and droplet formation of an adjacent jet. In general, interactions between the droplets formed from adjacent jets are not significant when a passage is spaced at a distance of at least about 1.2-5 times the diameter of each opening apart from the nearest passage, when the distance is measured from the center of each passage. Similarly, when a plurality of membranes are employed in a reactor or collection tank, the spacing and arrangement of the membranes are positioned so that the formation of droplets is not disrupted by the formation of droplets at an adjacent membrane.

Although membrane 18 can be prepared from a variety of materials including metal, glass, plastic or rubber, a perforated metal membrane is preferably employed. The membrane may be substantially metallic, or wholly metallic. The membrane may also contain a chemically-resistant metal such as a noble metal or stainless steel or may be pretreated with chemical reagents. Suitable materials and membrane configurations for use in this invention are disclosed, for example, in International Publication No. WO 2007/144658, which is incorporated herein by reference in its entirety. In an embodiment, the membrane may be made from nickel or be nickel-plated, and coated with a super-hydrophobic coating.

A super-hydrophobic coating may be applied to the surfaces of the membrane (including the surfaces surrounding and with the pores of the membrane) by coating with, for example, PTFE (polytetrafluroethylene) submicron (e.g., nanometer) beads in a nickel plating solution and applied to the membrane by electroless deposition. Such a coating may optionally be further coated with an amorphous fluoroplastic such as Teflon® AF 1600 (CAS 37626-13-4).

The vibration is provided by any means which oscillates or vibrates at a frequency capable of exciting the dispersed phase jet so that the dispersed phase jet is broken into droplets, preferably, droplets of a general uniform size. Vibrational excitation causes a uniform shear force across the membrane at a point of egression of the dispersed phase into the suspension phase. The shear force is thought to interrupt the dispersed phase flow through the membrane creating droplets. The shear force may be provided by rapidly displacing the membrane by vibrating, rotating, pulsing or oscillating movement. The direction of shear is substantially perpendicular to the direction of egression of the dispersed phase. Having the pore opening transverse to the oscillating force provides sufficient vibration acceleration to break the jets formed at the pore opening into droplets. The frequency of vibration of the membrane can be from 10 Hz to 20,000 Hz using commercially available vibratory exciters, and as high as 500,000 Hz if piezoelectric exciters are used, as supplied by Electro Dynamic shaker, Permanent magnet shaker or Piezo electro-cell. Typical frequencies of vibration are from 10 Hz-20000 Hz, preferably 20-100 Hz. Suitable amplitude values are in the range of about 0.001 to about 70 mm.

For the suspension polymerization process, the dispersed phase includes one or more polymerizable monomers which forms a discontinuous phase dispersed throughout the suspension medium upon the formation of droplets through the membrane. Polymerizable monomers of the invention are polymerizable monomers or mixtures of two or more copolymerizable monomers that are sufficiently insoluble in a liquid (or a liquid containing a surfactant) to form droplets upon the dispersion of the monomer in the liquid. Advantageously, the polymerizable monomers are monomers polymerizable using suspension polymerization techniques. Such monomers are well known in the art and are described in, for example, E. Trommsdoff et al., *Polymer Processes*, 69-109 (Calvin E. Schildknecht, 1956).

Water soluble polymerizable monomers are also included in the scope of the present invention. For example, the invention contemplates the use of monomers that form an aqueous solution in water, where the resulting solution is sufficiently insoluble in one or more other suspension liquids, generally a water-immiscible oil or the like, such that the monomer solution forms droplets upon its dispersion in the liquid. Representative water soluble monomers include monomers which can be polymerized using conventional water-in-oil suspension (i.e., inverse suspension) polymerization techniques such as described by U.S. Pat. No. 2,982,749, including ethylenically unsaturated carboxamides such as acrylamide, methacrylamide, fumaramide and ethacrylamide; aminoalkyl esters of unsaturated carboxylic acids and anhydrides; ethylenically unsaturated carboxylic acids, e.g., acrylic or methacrylic acid, and the like. Preferred monomers for use herein are ethylenically unsaturated carboxamides, particularly acrylamide, and ethylenically unsaturated carboxylic acids, such as acrylic or methacrylic acid.

Hydrocolloids and gel forming compounds are also included in the scope of the present invention. For example, the invention contemplates the use of agarose that forms an aqueous solution in water, where the resulting solution is sufficiently insoluble in one or more other suspension liquids, generally a water-immiscible oil or the like, such that the agarose or gel forming compound solution forms droplets upon its dispersion in the liquid. Representative water soluble hydrocolloids include dispersed phase which can be formed into a gel using any means well described in the literature and using techniques well known in the art. Subsequent crosslinking of the gel beads formed as above is accomplished as per available publications and using techniques well known in the art.

The amount of monomer present in the dispersed phase will vary. In one embodiment, the dispersed phase includes sufficient liquid to solubilize the monomer. In another embodiment, the monomer includes less than about 50 weight percent of the total monomer dispersed in the aqueous phase. Preferably, the monomer includes from about 30 to 50 weight percent of the monomer dispersed in the aqueous phase for gel polymers. In another embodiment, when a porogen is present, the monomer includes less than about 30 weight percent of the total monomer/aqueous phase. Preferably, the monomer includes from about 20 to 35 weight percent of the monomer dispersed in an aqueous phase for macroporous polymer.

Although the monomers can be polymerized using free radical initiation by UV light or heat, or a combination of these methods, in general, chemical radical initiators are preferably used in the present invention. Free radical initiators such as persulfates, hydrogen peroxides or hyperoxides can also be used. Typically, the ratio of organic initiator to dry monomer is about 0.1 to about 8%, or about 0.5 to about 2% by weight, preferably about 0.8 to about 1.5% by weight.

The liquid or suspension phase is a medium containing a suspending liquid immiscible with the polymerizable monomer or dispersed phase. Typically, when the dispersed phase includes a water-soluble monomer or a solution of hydrocolloids, a water-immiscible oil is used as the suspension phase. Such water-immiscible oils include, but are not limited to, halogenated hydrocarbons such as methylene chloride, liquid hydrocarbons, preferably having about 4 to about 15 carbon atoms, including aromatic and aliphatic hydrocarbons, or mixtures thereof such as heptane, benzene, xylene, cyclohexane, toluene, mineral oils and liquid paraffins.

The viscosity of the suspension phase is advantageously selected such that the monomer droplets can easily move throughout the suspension phase. In general, droplet formation is readily achieved, and movement of the droplets throughout the suspension medium is facilitated, when the viscosity of the suspension phase is higher or substantially similar to (e.g., of the same order of magnitude) as the viscosity of the dispersed phase. Preferably, the suspension medium has a viscosity of less than about 50 centipoise units (cps) at room temperature. Viscosity values of less than 10 cps are preferred. In one embodiment, the viscosity of the suspension phase is from about 0.1 to about 2 times the viscosity of the dispersed phase.

Examples of viscosity modifiers suitable for use with a water immiscible oil suspension phase of the invention include, but are not limited to, ethyl cellulose.

Typically, the suspension phase also contains a suspending agent. Examples of suspending agents known to those skilled in the art are surfactants with an HLB (hydrophilic-lipophilic balance) of below 5 Preferably, the total amount of suspending agent in the aqueous phase is from 0.05% to 4%, and more preferably, from 0.5% to 2%.

The polymerizable monomer droplets are formed by dispersing the monomer phase through the plurality of pores 32 of membrane into the suspension phase. The linear monomer flow rates through the membrane can vary from 1-50 cm/s, preferably 40, 30, 20, or less than 10 cm/s. The monomer droplets may be directed into the suspension phase by pumping or applying a pressure (or combination of pressurizing and pumping) to direct the dispersed phase into the suspension, preferably by pumping. In one embodiment, the applied pressure is in the range of 0.01 to 4 bar and preferably 0.1 to 1.0 bar. In another embodiment, a piston, or similar means such as a diaphragm is used for directing the dispersed phase into the suspension.

The polymerization reaction vessel 20 is advantageously agitated or stirred to prevent significant coalescence or additional dispersion of the monomer droplets during the polymerization. In general, the conditions of agitation are selected such that the monomer droplets are not significantly resized by the agitation, the monomer droplets do not significantly coalesce in the reaction vessel, no significant temperature gradients develop in the suspension and pools of monomer, which may polymerize to form large masses of polymer, are substantially prevented from forming in the reaction vessel. In general, these conditions can be achieved by using an agitator (paddle) such as described in Bates et al., "Impeller Characteristics and Power," Mixing, Vol. I, V. W. Uhl and J. B. Gray, Eds, published by Academic Press, New York (1966), pp. 116-118. Preferably, the agitator is of the anchor or gate types, as described on pp. 116-118 of Bates et al., or is of the "loop" or "egg beater" types. More preferably, the agitator bars extend up through the surface of the suspension as shown in FIG. 1, thereby preventing the formation of monomer pools on the surface of the suspension.

Upon completion of polymerization, the resulting polymer beads may be recovered by conventional techniques such as filtration. The recovered beads can then be further processed.

In another embodiment, it has been discovered that the rate of cooling of the polymer beads can affect the porosity of the finished beads. To provided controlled temperature changes, with reference to FIG. 1, after the beads are formed in reactor 20, they are piped in suspension to pulsating flow pump 22. The suspension is then transported through plug flow reactor 24, which reduces the temperature and thereby hardening of the beads in over a predetermined time period. The hardened beads 26 exiting plug flow reactor 24 are collected in collection vessel 28.

The method and compositions of the present invention provides a highly efficient and productive method for preparing uniform sized spheroidal polymer particles from polymerizable monomers, particularly monomers that are polymerizable using suspension polymerization techniques.

The following examples serve to more fully describe the manner of using the above-described invention, as well as to set forth the best modes contemplated for carrying out various aspects of the invention. It is understood that these examples in no way serve to limit the scope of the invention, but rather are presented for illustrative purposes.

EXAMPLES

Example 1

Preparation of a membrane with a superhydrophobic surface. A nickel plate having about 1500 pores per cm$^2$, each pore of 16 μm diameter, formed by electroforming, was fabricated into a double-walled cylindrical can shape ("can"). The can was then cleaned by soaking in 10% sodium hydroxide solution for 30 minutes, followed by a water wash. The can was then soaked in 5% citric acid solution for 30 minutes, followed by a water wash. The cleaned can was then soaked in a phosphorous nickel water solution (nickel 80 g/l (70-90 g/l)

Phosphorus 25 g/l (20-30 g/l)) at room temperature for 1 minute. The can was transferred to a tank containing PTFE electroless nickel plating solution held at 85° C. and the plating maintained for 10-30 minutes. (from Caswell Europe). The can was then washed with sonication in an ultrasonic water bath, and dried at 160° C. for 2 hours. The can was then washed in a toluene bath 3 times, and then dried at 60° C. for 1 hour. The PFTE-coated can was then soaked in 0.5% Teflon AF solution (Sigma Aldrich CAS 37626-13-4) in Fluorinert FC-70, electronic liquid (obtained from 3M Performance Materials, St. Paul, Minn.) for 2 hours at ambient temperature. The Teflon AF-coated can was then flushed with pure Fluorinert FC-70, and finally dried at 160° C. for 2 hours.

Example 2

Preparation of Uniform Agarose Beads (82 μm Volume Mean Diameter)

Agarose beads of uniform particle size were manufactured using the apparatus configuration shown in FIG. 1. An agarose phase (dispersed phase) was prepared at neutral pH containing:

| | |
|---|---|
| Distilled water | 1.8 kg |
| Agarose | 84.5 g |

The continuous (suspension) phase consists of mineral oil SIPMED 15 with 1.5% SPAN 80 non-ionic surfactant (sorbitan oleate) in it.

The dispersed monomer phase was prepared in a 3 liter jacketed reactor with paddle overhead stirrer by suspension of agarose in water at room temperature. The temperature was increased to 90° C. and stirred at this temperature for 90 minutes. The temperature was then reduced to 80° C. (which was the injection temperature). The dispersed phase was then fed to the membrane at a flow rate of 16 ml/min.

The membrane used in this Example was a 4×4 cm (L/d) nickel-based superhydrophobic membrane (pure nickel) containing around 250,000 16 μm conical through holes connecting the suspension and disperse phases. The disperse phase was then directed through the membrane into the suspension phase at a rate of 16 ml/min using a gear pump. The membrane was vibrationally excited to a frequency of 21 Hz and amplitude 2.6 mm as the agarose phase was dispersed in the suspension phase, forming a plurality of agarose droplets in the suspension phase. The resultant droplet emulsion was fed into a 5 liter glass reactor flask under agitation sufficient to suspend the droplets without resizing the droplets. The reactor was then cooled to 20' C. After separating the agarose beads from the oil phase and washing the beads, the following properties were noted: the volume mean particle diameter was 82 μm; uniformity coefficient was 1.28; and SPAN of distribution was 0.44. SPAN is defined as (D90–D10)/D50 or the diameter of a bead at 90% volume minus the diameter at 10% volume divided by the diameter of the bead at 50% volume, to provide a dimensionless normalized to mean size distribution spread or yield.

Example 3

Preparation of Uniform Agarose Beads (63 μm Volume Mean Diameter)

Example 2 was repeated except that the frequency of membrane vibration was 21.5 Hz and amplitude was 3 mm. After separating the agarose beads from oil and washing, the following properties were noted: Volume average particle diameter 63 μm; uniformity coefficient of 1.20; and SPAN=0.32.

Example 4

Preparation of Uniform Agarose Beads (71 μm Volume Mean Diameter)

Example 2 was repeated except that the frequency of membrane vibration was 21 Hz and amplitude was 2.8 mm. After separating the agarose beads from oil and washing, the following properties were noted: Volume average particle diameter 71 μm; uniformity coefficient of 1.29; and SPAN=0.45.

Figure 4:
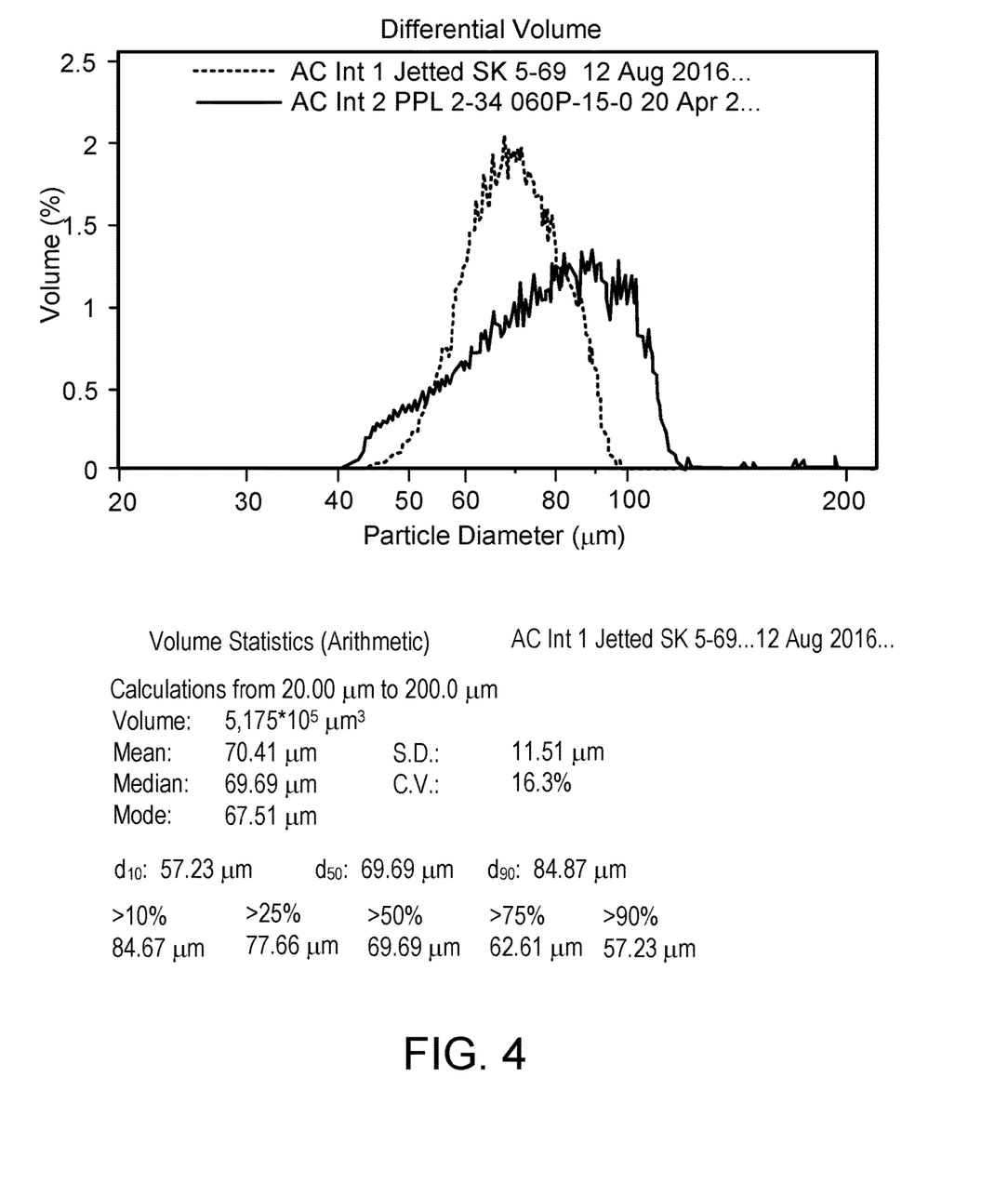
FIG. 4 is a graph illustrating particle size distribution of polymer beads according to an example of the invention.

Results of standard stirred batch emulsification for agarose solution with the same concentration presented in Table 1 together with Example 4 results. The stirred batch beads were screened over 40 and 120 um sieves. Volume size distributions for both measured by Coulter Multisizer are presented in FIG. 4.

TABLE 1

|  | D50 Um | UC | Span = (d90-d10)/d50 |
|---|---|---|---|
| Can jetted | 71 | 1.25 | 0.38 |
| Stirred batch emulsification screened with 40 μm and 120 μm sieve | 78 | 1.35 | 0.63 |

Example 5

Example 2 was repeated except that the frequency of membrane vibration was 21.5 Hz and the amplitude was 2.8 mm. After separating the agarose beads from oil and washing, the following properties were noted: Volume average particle diameter 66 μm; uniformity coefficient of 1.23; and SPAN=0.35.

Figure 5:
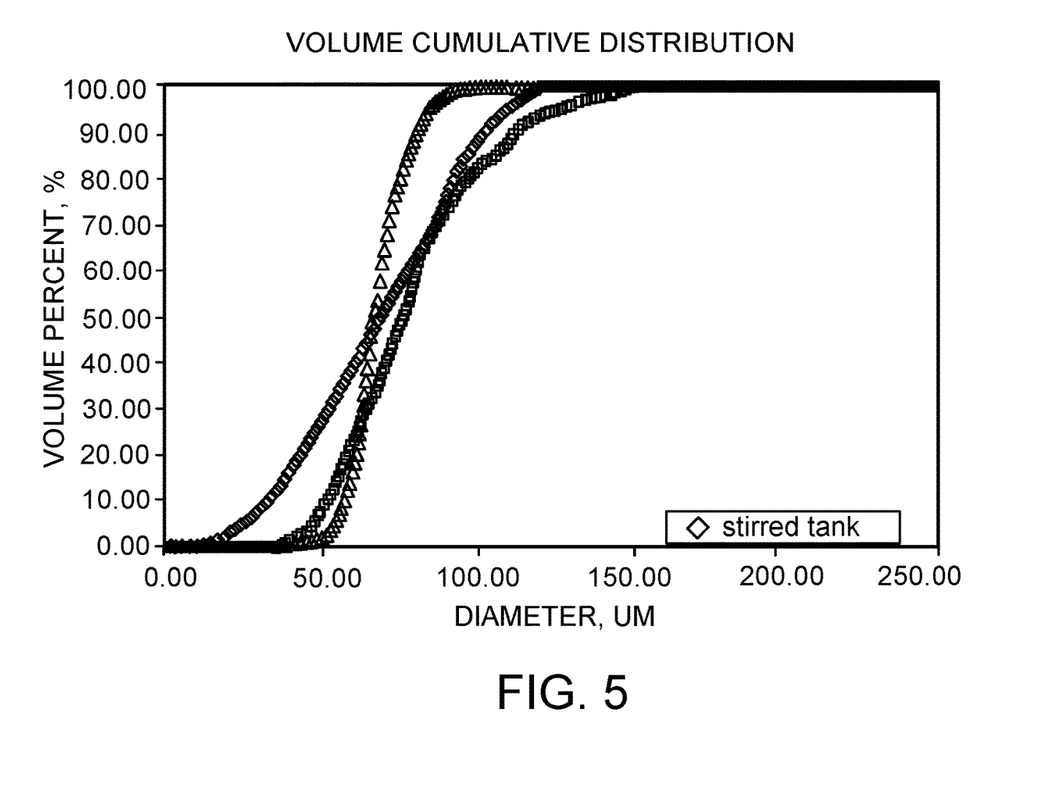
FIG. 5 is a graph illustrating particle size distribution of polymer beads according to an example of the invention.

Results of standard stirred batch emulsification for agarose solution with the same concentration presented in Table 1 together with Example 5 results. The beads were screened over 40 and 120 um sieves. Volume size distributions for all three measured by microscope are presented in Table 2 and FIG. 5.

TABLE 2

|  | Stirred Batch | Stirred batch screened 40-120 um | Jetted Beads |
|---|---|---|---|
| D2.5, um | 19 | 45 | 51 |
| D5, um | 24 | 48 | 54 |
| D10, um | 32 | 52 | 56 |
| D20, um | 43 | 59 | 61 |
| D50, um | 69 | 76 | 66 |
| D60, um | 77 | 82 | 69 |
| D70, um | 87 | 88 | 72 |
| D80, um | 98 | 94 | 75 |
| D90, um | 112 | 103 | 80 |
| D95, um | 126 | 110 | 84 |
| D97.5, um | 143 | 116 | 89 |
| Spread 90%, um | 102 | 63 | 30 |
| Spread 95%, um | 125 | 72 | 38 |
| UC | 2.43 | 1.57 | 1.23 |
| SPAN | 1.16 | 0.67 | 0.35 |

Example 6

Preparation of Uniform Agarose Beads with Hydrophobic Membrane and Superhydrophobic Membrane One 40×40 mm can was used after hydrophobic treatment and superhydrophobic treatment. Initially pure Nickel membrane was soaked in 0.5% Teflon AF solution (Sigma Aldrich CAS 37626-13-4) in Fluorinert FC-70 electronic liquid (obtained from 3M Performance Materials, St. Paul, Minn.) for 2 hours at ambient temperature. The Teflon AF-coated can was then flushed with pure Fluorinert FC-70, and finally dried at 160° C. for 2 hours.

After producing a batch, the membrane was stripped from Teflon AF, and superhydrophobic treatment performed as described in Example 1.

The same vibrational condition was used (24 Hz, amplitude 3 mm, and injection rate 14 ml/min) for emulsification by the hydrophobic and superhydrophobic membranes.

The results of emulsifications are shown in Table 3. After about one hour of injection by hydrophobic membrane the PSD becomes wide, bigger drops were formed, and finally the PSD becomes substantially worse than that obtained with the superhydrophobic membrane. The uniformity coefficient (UC) of distribution for superhydrophobic membrane is 1.26, however for the hydrophobic membrane it is 1.60.

TABLE 3

| Run | superhydrophobic membrane | hydrophobic membrane |
|---|---|---|
| Beads counted | 2801.0 | 2742.0 |
| D2.5, um | 42.13 | 53.88 |
| D5, um | 43.88 | 65.6 |
| D10, um | 45.38 | 71.6 |
| D20, um | 48.88 | 80.9 |
| D50, um | 54.63 | 107 |
| D60, um | 57.38 | 115 |
| D70, um | 58.88 | 134 |
| D80, um | 61.38 | 149 |
| D90, um | 65.63 | 165 |
| D95, um | 68.13 | 203 |
| D97.5, um | 71.63 | 224 |
| Spread 90%, um | 24.3 | 138 |
| Spread 95%, um | 29.5 | 164 |
| UC | 1.264 | 1.60 |
| SPAN | 0.371 | 0.882 |

Figure 6:
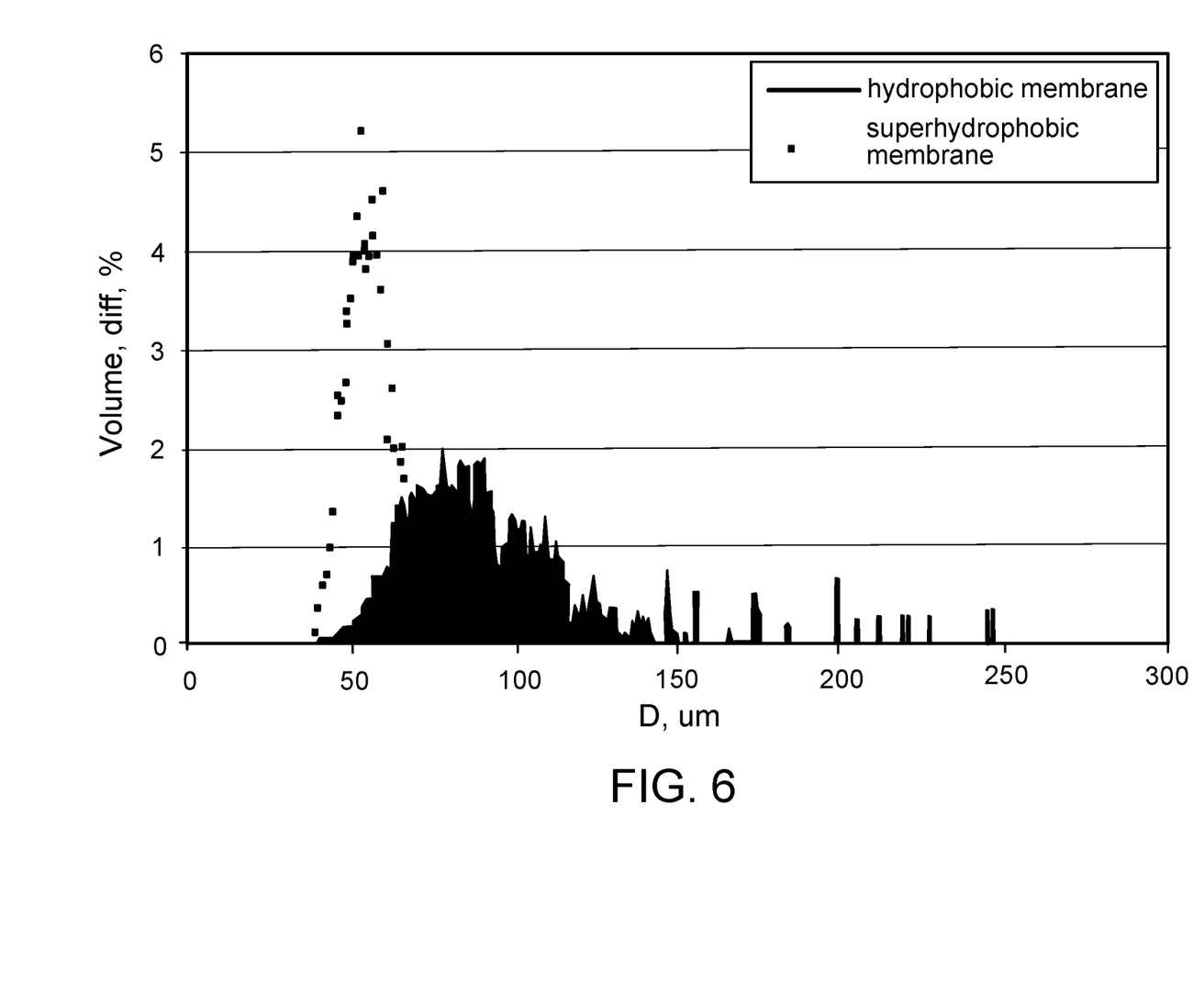
FIG. 6 is a graph illustrating particle size distribution of polymer beads according to an example of the invention.

The results of Table 3 are graphically represented in FIG. 6.

Example 7

Using Plug Flow Reactor for Controllable Drops Solidification

In this example, two batches of drops produced under the same conditions using same membrane passed through plug flow reactor with different cooling temperature profile. In first case cooling from 80° C. down to 20° C. took place over 15-20 minutes. However, in the second case, the drops were cooled to 20° C. over a 200-250 minute period. Porous agarose beads obtained were tested for porosity by Size Exclusion Chromatography. Partition coefficients were measured for the proteins listed in Table 4. Rapid cooling provides smaller partition coefficients than slow cooling, hence porosity for fast cooled beads is less.

TABLE 4

|  | MW | fast cooling | slow cooling |
|---|---|---|---|
| Thyroglobulin | 669000 | 0.45 | 0.55 |
| Ferritin | 440000 | 0.57 | 0.65 |
| Bovine Serum Albumin | 67000 | 0.72 | 0.75 |
| Ribonuclease A | 13700 | 0.87 | 0.86 |

What is claimed is:

1. A method for preparing spheroidal polymer beads having a volume average particle diameter of about 10 to about 180 um, the method comprising the steps of:
providing an apparatus comprising a metallic membrane containing a plurality of through holes, wherein the metallic membrane is nickel and is coated with a superhydrophobic polytetrafluoroethylene coating, wherein a first volume is in contact with a first side of the membrane and a second volume is in contact with a second side of the membrane, the first volume comprising a polymerizable monomer phase, the second volume comprising a liquid immiscible with the monomer phase;
dispersing the first volume through the through holes into the second volume under conditions sufficient to form a plurality of monomer droplets comprising the polymerizable monomer, wherein a shear force is provided at a point of egression of the first volume into the second volume, the direction of shear substantially perpendicular to the direction of egression of the first volume, and the shear force is provided by displacing the membrane relative to the second volume; and
polymerizing the droplets dispersed in the second volume.

2. The method according to claim 1, wherein the membrane comprises from about 200 to about 2,000 through holes per $cm^2$ of the membrane.

3. The method according to claim 1, wherein the through holes have a diameter in the range of about 1 μm to about 100 μm.

4. The method according to claim 3, wherein the through holes have a diameter in the range of about 20 μm to about 60 μm.

5. The method according to claim 1, wherein the plurality of through holes are positioned from each other at a distance of at least about 20 times the diameter of each through hole when the distance is measured from the center of each through hole.

6. The method according to claim 1, wherein the monomer phase is dispersed through the through holes into the second volume at a rate of about 1 to about 50 cm/s.

7. The method according to claim 1, wherein the beads have a particle size distribution having a uniformity coefficient of less than 1.2.

8. The method according to claim 1, wherein the displacing is rotating, pulsing, or oscillating movement.

9. The method according to claim 1, wherein the first volume is dispersed into the second volume by applying pressure to the first volume.

10. The method according to claim 1, wherein the membrane is nickel-plated.

11. The method according to claim 1, wherein the plurality of through holes are conical shaped.

12. The method according to claim 1, wherein the through holes are in the shape of a slot, with an aspect ratio of slot width to slot length of at least 1:2.

13. The method according to claim 1, wherein the dispersed phase comprises agarose or other gel forming compounds.

14. The method according to claim 1, wherein the polymerizable monomer phase comprises a porogen.

15. The method of claim 1 wherein the polytetrafluoroethylene coating comprises particles of polytetrafluoroethylene.

16. The method of claim 15, wherein said particles are nanoparticles.

17. The method of claim 1 wherein the polytetrafluoroethylene coating further comprises nanoparticles of elemental nickel.

18. The method of claim 1, wherein the superhydrophobic coating is applied to said membrane by electroless deposition.

19. The method of claim 1, further comprising a coating of amorphous polytetrafluoroethylene applied to the upper surface of the polytetrafluoroethylene coating.

20. A method for preparing spheroidal agarose beads having a volume average particle diameter of about 10 to about 180 um, the method comprising the steps of:
providing an apparatus comprising a metallic membrane containing a plurality of through holes, wherein the metallic membrane is nickel and is coated with a superhydrophobic polytetrafluoroethylene coating, wherein a first volume is in contact with a first side of the membrane and a second volume is in contact with a second side of the membrane, the first volume comprising agarose solution, the second volume comprising a liquid immiscible with the agarose solution;
dispersing the agarose solution through the through holes into the liquid immiscible with the agarose solution under conditions sufficient to form a plurality of agarose droplets, wherein a shear force is provided at a point of egression of the first volume into the second volume, the direction of shear substantially perpendicular to the direction of egression of the first volume, and the shear force is provided by displacing the membrane relative to the second volume; and
hardening the agarose droplets dispersed in the second volume to form agarose beads.

21. The method of claim 20 wherein the polytetrafluoroethylene coating comprises particles of polytetrafluoroethylene.

22. The method of claim 21, wherein said particles are nanoparticles.

23. The method of claim 20, wherein the superhydrophobic coating further comprises nanoparticles of elemental nickel.

24. The method of claim 20, wherein the superhydrophobic coating is applied to said membrane by electroless deposition.

25. The method of claim 20 further comprising a coating of amorphous polytetrafluoroethylene applied to the upper surface of the polytetrafluoroethylene coating.

26. A method for preparing spheroidal agarose beads having a volume average particle diameter of about 10 to about 180 um, the method comprising the steps of:
providing an apparatus comprising a metallic membrane containing a plurality of through holes, wherein the metallic membrane is nickel and is coated with a superhydrophobic polytetrafluoroethylene coating, wherein an aqueous agarose solution is in contact with a first side of the membrane and mineral oil is in contact with a second side of the membrane;
dispersing the agarose solution through the through holes into the mineral oil under conditions sufficient to form a plurality of agarose droplets, wherein a shear force is provided at a point of egression of the agarose solution into the mineral oil, the direction of shear substantially perpendicular to the direction of egression of the agarose solution, and the shear force is provided by displacing the membrane relative to the mineral oil; and
hardening the agarose droplets dispersed in the mineral oil to form agarose beads.

27. The method of claim 26 wherein the polytetrafluoroethylene coating comprises particles of polytetrafluoroethylene.

28. The method of claim 27, wherein said particles are nanoparticles.

29. The method of claim 26, wherein the superhydrophobic coating further comprises nanoparticles of elemental nickel.

30. The method of claim 26, wherein the superhydrophobic coating is applied to said membrane by electroless deposition.

31. The method of claim 26, wherein the agarose solution is heated before it is dispersed through the through holes.

32. The method of claim 26 further comprising a coating of amorphous polytetrafluoroethylene applied to the upper surface of the polytetrafluoroethylene coating.

\* \* \* \* \*